United States Patent
Yu et al.

(10) Patent No.: US 9,660,713 B2
(45) Date of Patent: May 23, 2017

(54) METHOD AND APPARATUS FOR OBTAINING CHANNEL DIRECTION INFORMATION

(71) Applicant: Samsung Electronics Co., Ltd., Gyeonggi-do (KR)

(72) Inventors: Bin Yu, Beijing (CN); Pengfei Sun, Beijing (CN); Dalin Zhu, Beijing (CN); Fang Yuan, Beijing (CN); Ming Lei, Beijing (CN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/839,277

(22) Filed: Aug. 28, 2015

(65) Prior Publication Data

US 2016/0065288 A1 Mar. 3, 2016

(30) Foreign Application Priority Data

Aug. 28, 2014 (CN) .......................... 2014 1 0432196

(51) Int. Cl.
*H04B 7/02* (2006.01)
*H04B 7/06* (2006.01)
*H04B 7/0413* (2017.01)

(52) U.S. Cl.
CPC ......... *H04B 7/0617* (2013.01); *H04B 7/0413* (2013.01); *H04B 7/0626* (2013.01)

(58) Field of Classification Search
CPC ................ H04L 1/02; H04L 1/06; H04B 7/02
(Continued)

(56) References Cited

U.S. PATENT DOCUMENTS

2009/0245411 A1* 10/2009 Goldberg ............... H01Q 1/241
375/267
2011/0194593 A1 8/2011 Geirhofer et al.
(Continued)

FOREIGN PATENT DOCUMENTS

WO 2014-036070 3/2014

OTHER PUBLICATIONS

International Search Report mailed Dec. 7, 2015 corresponding to International Application No. PCT/KR2015/009089.
(Continued)

*Primary Examiner* — Daniel Washburn
*Assistant Examiner* — Fitwi Hailegiorgis
(74) *Attorney, Agent, or Firm* — McAndrews, Held & Malloy, Ltd.

(57) ABSTRACT

The present disclosure relates to a pre-5th-Generation (5G) or 5G communication system to be provided for supporting higher data rates Beyond 4th-Generation (4G) communication system such as Long Term Evolution (LTE).
The present disclosure discloses a method for obtaining channel direction information, which includes: transmitting a first detection signal and a second detection signal in at least one detection region, wherein there is differential information between the first detection signal and the second detection signal; receiving a signal receiving characteristic of the first detection signal and a signal receiving characteristic of the second detection signal from a receiver; and adjusting channel direction information (CDI) according to the signal receiving characteristic of the first detection signal and the signal receiving characteristic of the second detection signal. The present disclosure further discloses an apparatus for obtaining channel direction information.

19 Claims, 11 Drawing Sheets

(58) Field of Classification Search
USPC .......................................... 375/267; 455/517
See application file for complete search history.

(56) References Cited

U.S. PATENT DOCUMENTS

| | | | |
|---|---|---|---|
| 2012/0322492 A1* | 12/2012 | Koo ..................... | H04B 7/0417 |
| | | | 455/517 |
| 2013/0114751 A1* | 5/2013 | Nagata .................. | H04B 7/024 |
| | | | 375/267 |
| 2014/0044044 A1 | 2/2014 | Josiam et al. | |
| 2014/0064236 A1 | 3/2014 | Nagata et al. | |
| 2014/0192917 A1 | 7/2014 | Nam et al. | |

OTHER PUBLICATIONS

Written Opinion of the International Searching Authority mailed Dec. 7, 2015 corresponding to International Application No. PCT/KR2015/009089.

\* cited by examiner

METHOD AND APPARATUS FOR OBTAINING CHANNEL DIRECTION INFORMATION

RELATED APPLICATION(S)

This application claims the priority under 35 U.S.C. §119(a) to Chinese Patent Application No.: 201410432196.1, which was filed in the Chinese Intellectual Property Office on Aug. 28, 2014, the entire content of which is hereby incorporated by reference.

BACKGROUND

The present disclosure relates to a wireless communication technology field, and more particularly, relates to a method and apparatus for obtaining channel direction information.

To meet the demand for wireless data traffic having increased since deployment of 4G (generation) communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Multiple-Input-Multiple-Output (MIMO) technology can improve spectral efficiency of a wireless communication system through channel's spatial resources. In order to obtain corresponding spectral efficiency, a transmitter has to obtain Channel Direction Information (CDI) so as to perform pre-coding calculation and to process other MIMO signals. Channel State Information (CSI) includes the CDI and Channel Quality Information (CQI). For a MIMO system, it is a prerequisite to perform closed-loop MIMO transmission, and impacts the system performance that the transmitter obtains a precise CDI.

In a Long Term Evolution (LTE) system corresponding to an Evolved Universal Terrestrial Radio Access (E-UTRA) protocol defined by a $3^{rd}$ Generation Partnership Project (3GPP), according to different duplex modes, there are different CDI obtaining ways. LTE duplex modes include Time Division Duplexing (TDD) and Frequency Division Duplexing (FDD).

In a TDD system, a same spectral resource is multiplexed for an uplink channel and a downlink channel, wherein there is Channel Reciprocity for the uplink channel and the downlink channel. Thus, when channel estimation is performed for the uplink channel, a TDD base station can obtain equivalent CDI of the downlink channel. In order to assist the channel estimation, a terminal transmits an omnidirectional Sounding Reference Signal (SRS) generated through a designated sequence that is convenient for the channel estimation and the pilot signal multiplexing, e.g., a Zadoff-Chu (ZC) sequence, a Pseudo-Noise sequence, wherein a pilot signal is known by the terminal and the base station. In a LTE TDD system, a shortcoming of obtaining the CDI through a way of SRS transmission and the channel estimation is a problem of pilot contamination. In the LTE system, SRS sequences assigned for different terminals in a same cell are orthogonal. According to the SRS sequences of the different terminals, a base station can perform non-interference channel estimation to obtain the CDI of the uplink channel. However, in the LTE system, SRS sequences assigned for different terminals in different cells are non-orthogonal. When estimating the CDI of an uplink channel of a terminal in a cell, a base station can be disturbed by uplink SRS signals from terminals of another cell. That is, the CDI of the channel of the cell estimated by the base station includes CDI from the terminals of the other cells to the base station, which is referred to as a problem of the pilot contamination. The pilot contamination will cause serious consequences for uplink data transmission and downlink data transmission.

1) When the base station transmits data through a directional pre-coding on the downlink channel for a desired terminal, it is equivalent that the base station transmits data of the direction to terminals of a neighbor cell on an overlapped channel, and the data of the direction is a serious interference among cells.

2) When the base station processes received data transmitted directionally by the desired terminal on the uplink channel, the base station also perform enhancement processing for data transmitted by terminals of a neighbor cell on an overlapped channel, thus, interference of the overlapped channel is amplified.

According to reasons above, the pilot contamination impacts system throughput. When the number of antennas is increased, a bottleneck of improving system performance may occur.

A Large-scale MIMO (also referred as to a Massive MIMO) system generally improves spectral efficiency in $5^{th}$ Generation (5G) cellular communication. Through a Large-scale MIMO or a Massive MIMO, rich freedom of signal processing is utilized in the system, interference among terminals and interference among cells can be reduced, computational complexity can be reduced, and communication link quality can be improved. In addition, through the Large-scale MIMO or a Massive MIMO, power consumption of a single antenna unit can be reduced, and power efficiency of the system can be improved. Since the adopted spectrum is gradually moving from a low frequency to a high frequency (form factor of antennas is gradually decreased), a future base station device and a mobile device may adopt a much larger number of antennas than present. At present, in a prototype testing system, availability and an industrial applicability of system with more than 64 antennas has been tested. An implementation in a millimeter-wave frequency in a Large-scale MIMO system or a Massive MIMO system includes procedures as follows. When a distance between antennas is short (in a level of a half-carrier wavelength), by configuring the Large-scale MIMO system or the Massive MIMO system, a base station generates extremely-narrow transmission beams to serve multiple terminals. At the same time, a terminal can also be configured with multiple antennas to generate different gains for different beam directions and to select a reception beam with a high gain to perform data reception. When each transmission beam of the base station serves a terminal, interferences among terminals can be reduced. When base stations use different directional beam to serve their terminals, interferences among cells can be reduced. In the Large-scale MIMO system or the Massive MIMO system, when the transmitter knows a precise CDI, a signal-to-noise ratio (SNR) of the uplink channel and the downlink channel is increased in accordance with increase of the number of antennas. Thus, when there are scores of or hundreds of antennas, system capacity can be improved. When the pilot contamination occurs, an actual capacity of the Large-scale MIMO system or the Massive MIMO system can be seriously decreased. Even though a transmission power of the base station is low, the system still works in an interference-limitation state. Pilot contamination causes a serious impact for the Large-scale MIMO system or the Massive MIMO system. Thus, in order to improve system capacity, it is important to introduce a new method for obtaining CDI to solve the pilot contamination in the Large-scale MIMO system or the Massive MIMO system.

In a FDD system, since an uplink channel and a downlink channel are respectively located in different frequency bands, there is no Channel Reciprocity between the uplink channel and the downlink channel. A base station cannot obtain CDI of the downlink channel through estimating the uplink channel. In such a condition, a terminal has to occupy a part of resources of the uplink channel to feed the CDI back to the base station. A method of obtaining the CDI is through explicit feedback. The terminal quantizes the CDI of the downlink channel through a fixed codebook. A quantization result is reported to the base station through the uplink channel. Another method is implicit feedback. According to CDI of the downlink channel, the terminal selects a desired pre-code from several fixed pre-codes, and reports a selection result to the base station through the uplink channel. Regardless which method is adopted, in order to make the base station obtain precise CDI of the downlink channel, overhead occupied for uplink feedback of the terminal has to be increased in accordance with increase of the number of antennas. That is, a method that CDI is obtained based on feedback in a current FDD system cannot apply to the Large-scale MIMO system or the Massive MIMO system. That is because the number of antennas is large, and overhead of uplink feedback about the CDI of the terminal will be a load of the system.

It can be seen from the above that, in a design of the 5G communication system, it is to solve a problem of obtaining CDI in a Large-scale MIMO system or a Massive MIMO system. A fast and effective method for obtaining CDI can decrease signaling overhead and reference overhead of the system, relieve pilot contamination, ensure spectral efficiency introduced by a Large-scale MIMO system or a Massive MIMO, and improve system capacity of the cell.

SUMMARY

A method and apparatus for obtaining channel direction information is provided according to an embodiment of the present disclosure so that signal overhead is reduced, and the pilot contamination impact for a Large-scale MIMO system or a Massive MIMO system is reduced.

A method for obtaining channel direction information includes: transmitting a first detection signal and a second detection signal in at least one detection region, wherein there is differential information between the first detection signal and the second detection signal;

receiving a signal receiving characteristic of the first detection signal and a signal receiving characteristic of the second detection signal from a receiver; and adjusting channel direction information (CDI) according to the signal receiving characteristic of the first detection signal and the signal receiving characteristic of the second detection signal.

Preferably, the at least one detection region is one subspace of a channel direction space, multiple detection regions collectively cover the channel direction space, the multiple direction regions correspond to at least two levels, and each level includes of at least one detection region; spatial granularities of different levels are different, the transmission of the first detection signal and the second detection signal starts with a direction region of a level with a widest spatial granularity.

Preferably, transmitting the first detection signal and the second detection signal in the at least one detection region includes: transmitting the first detection signal and configuration information of the first detection signal in at least one detection regions of a current level, and receiving feedback of the signal receiving characteristic of the first detection signal; according to the signal receiving characteristic of the first detection signal, selecting a detection region to transmit the second detection signal, configuration information of the selected detection region and configuration information of the second detection signal, receiving feedback of the signal receiving characteristic of the second detection signal; adjusting the CDI according to the signal receiving characteristic of the second detection signal.

Preferably, transmitting the first detection signal and the second detection signal in the at least one detection region includes: transmitting the first detection signal, the second detection signal, configuration information of the first detection signal and configuration information of the second detection signal in at least one detection regions of a current level, and receiving feedback of the signal receiving characteristic of the first detection signal and the signal receiving characteristic of the second detection signal;

adjusting the CDI according to the signal receiving characteristic of the first detection signal the signal receiving characteristic of the second detection signal.

Preferably, after the CDI is adjusted, the method further includes: determining whether at least one detection region of a next level with smaller granularity is to be detected, when it is determined that the detection region of the at least one next level is to be detected, taking the next level as the current level, and performing an operation of transmitting the first detection signal and the second detection signal in the at least one detection region.

Preferably, selecting the detection region according to the signal receiving characteristic of the first detection signal includes: selecting a detection region where a receiving gain of the first detection signal is highest.

Preferably, transmitting the first detection signal and the configuration information of the first detection signal in the at least one detection regions of the current level includes: selecting at least one detection region of the current level to form a detection set; transmitting the first detection signal in the at least one detection region in the detection set, and notifying configuration information of the detection set to the receiver.

Preferably, transmitting the first detection signal, the second detection signal, the configuration information of the first detection signal and the configuration information of the second detection signal in at least one detection regions of the current level includes: selecting at least one detection region of the current level to form a detection set; transmitting the first detection signal and the second detection signal in the at least one detection region in the detection set at the same time, and notifying configuration information of the detection set to the receiver.

Preferably, the configuration information of the detection set includes at least one type of information as follows: a level of each of the at least one detection region, the number of the at least one detection region, an index of each of the at least one detection region, a time-frequency resource location of the first detection signal or the second detection signal, a multiplexing method of the detection signal and a sequence adopted by the detection signal.

Preferably, there is differential information between the second detection signal and the corresponding first detection signal, the process of adjusting the CDI includes: determining a CDI detection error according to the signal receiving characteristic of the first detection signal and the signal receiving characteristic of the second detection signal fed back from the receiver; adjusting the CDI according to a direction of the first detection signal and the CDI detection error.

Preferably, transmission beam forming of the first detection signal is:

$$w1 = \begin{bmatrix} 1, e^{j2\pi \frac{d}{\lambda}\sin(\theta_{prob})}, \ldots e^{j2\pi(\frac{N}{2}-1)\sin(\theta_{prob})d/\lambda}, \\ e^{j2\pi(\frac{N}{2}+1)\sin(\theta_{prob})d/\lambda} \ldots e^{j2\pi(N-1)\sin(\theta_{prob})d/\lambda} \end{bmatrix}^T,$$

and transmission beam forming of the second detection signal is:

$$w2 = \begin{bmatrix} 1, e^{j2\pi \frac{d}{\lambda}\sin(\theta_{prob})}, \ldots e^{j2\pi(\frac{N}{2}-1)\sin(\theta_{prob})d/\lambda}, \\ -e^{j2\pi(\frac{N}{2}+1)\sin(\theta_{prob})d/\lambda} \ldots -e^{j2\pi(N-1)\sin(\theta_{prob})d/\lambda} \end{bmatrix}^T$$

where a sign of first half of a beam forming coefficient of the second detection signal is the same as the sign of first half of the beam forming coefficient of the first detection signal, a sign of latter half of the beam forming coefficient of the second detection signal is contrary to the sign of latter half of the beam forming coefficient of the first detection signal.

Preferably, an effective detection range of the second detection signal is in a coverage range of a main lobe of the first detection signal within the selected detection region, or within a range of the selected detection region. Further, characteristics of the first detection signal group and a second detection signal group transmitted to receivers of different CDI are different.

Preferably, the signal receiving characteristic of the first detection signal includes, but is not limited to, a receiving gain of the first detection signal, a signal-to-noise ratio and a receiving-gain ratio; the signal receiving characteristic of the first detection signal is a result quantized by a fixed codebook; the signal receiving characteristic of the second detection signal includes, but is not limited to, a receiving gain of the second detection signal, a signal-to-noise ratio and a receiving-gain ratio; the signal receiving characteristic of the second detection signal is a result quantized by the fixed codebook, wherein the fixed codebook includes a uniform quantization codebook or a non-uniform quantization codebook.

Preferably, the signal receiving characteristic includes a quantized complex number ratio of a receiving gain of the first detection signal relative to a receiving gain of the second detection signal a process of adjusting the CDI includes: determining the CDI detection error of the receiver according to a relationship between the ratio and the CDI detection error; according to the determined CDI detection error, adjusting the obtained CDI based on a transmission direction of the first detection signal.

Preferably, transmitting the first detection signal and the transmitted second detection signal respectively includes: generating beam forming of a designated direction in a horizontal direction and/or a vertical direction through multiple transmission antennas, and transmitting a beam formed signal wherein a center of a main lobe of the beam of the designated direction points to a center direction of the direction region, and an angle bandwidth of the main lobe covers the detection region, wherein the first detection signal includes: a synchronization signal, a cell-specific reference signal (CRS), a channel state information reference signal (CSI-RS), the second detection signal includes: a synchronization signal, a CRS, a CSI-RS.

An apparatus for obtaining channel direction information includes: a detection module, to transmit a first detection signal and a second detection signal in at least one detection region, wherein there is differential information between the first detection signal and the second detection signal; a receiving module, to receive a signal receiving characteristic of the first detection signal and a signal receiving characteristic of the second detection signal from a receiver; and a processing module, to adjust channel direction information (CDI) according to the signal receiving characteristic of the first detection signal and the signal receiving characteristic of the second detection signal.

Preferably, the at least one detection region is one subspace of a channel direction space, the channel direction space includes multiple direction regions, multiple detection regions collectively cover the channel direction space, the multiple direction regions correspond to at least two levels, and each level includes of at least one detection region; spatial granularities of different levels are different, the transmission of the first detection signal and the second detection signal starts with a direction region of a level with a widest spatial granularity.

It can be seen from the above that, according to a technical solution for obtaining channel direction information provided according to an embodiment of the present disclosure, through an active detection way, the pilot contamination impact for a Large-scale MIMO system or a Massive MIMO system is reduced. Efficiency of detecting a pilot signal is improved. Furthermore, the method according to an embodiment of the present disclosure can also apply to a millimeter-wave communication system. In detail, by combining a super-narrow beam, pilot signal transmission can be detected.

DETAILED DESCRIPTION OF THE DISCLOSURE

In order to make the object, technical solution and merits of the present disclosure clearer, the present disclosure will be illustrated in detail hereinafter with reference to the accompanying drawings and specific examples.

A method for fast obtaining channel direction information is provided according to an embodiment of the present disclosure. Through an active detection way, the pilot contamination impact for a Large-scale MIMO system or a Massive MIMO system is reduced. Efficiency of detecting a pilot signal is improved. The method according to an embodiment of the present disclosure can also apply to a millimeter-wave communication system. In detail, by combining a super-narrow beam, pilot signal transmission can be detected.

Figure 1:
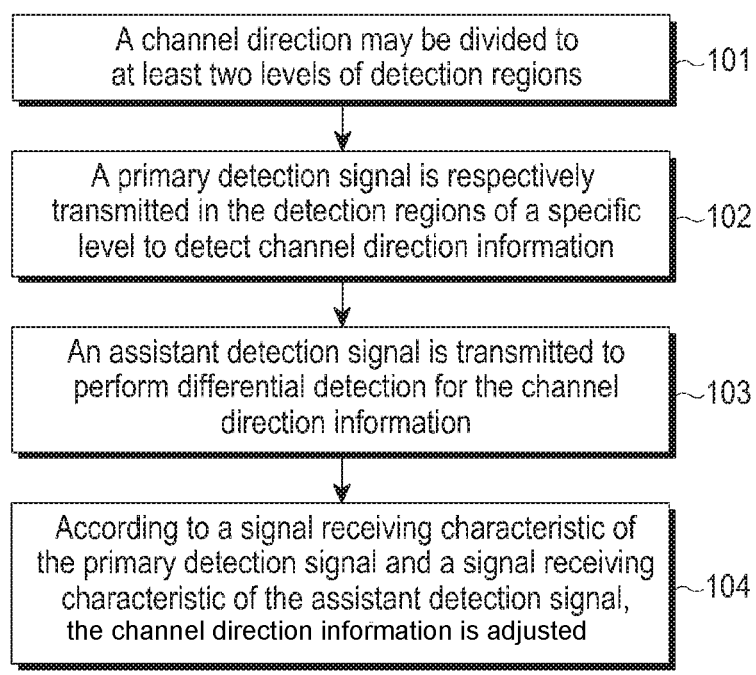
FIG. 1 is a flowchart illustrating a method for obtaining channel direction information according to an embodiment of the present disclosure.

FIG. 1 is a flowchart illustrating a method for obtaining channel direction information. The method includes procedures as follows.

At block 101, a channel direction may be divided to at least two levels of detection regions.

At block 102, a primary detection signal is respectively transmitted in the detection regions of the at least two levels to detect channel direction information.

At block 103, an assistant detection signal is transmitted to perform differential detection for the channel direction information.

At block 104, according to a signal receiving characteristic of the primary detection signal and a signal receiving characteristic of the assistant detection signal, the channel direction information is adjusted.

The primary detection signal and the assistant detection signal respectively correspond to a first detection signal and a second detection signal in claims, there is differential information between the primary detection signal and the assistant detection signal.

There is a wide scope of the method according to an embodiment of the present disclosure. In detail, the method can apply to a base station. The base station can obtain downlink channel direction information of a terminal through a multiple antenna array. The method can also apply to a terminal. The terminal can obtain uplink channel direction information of the base station by a multiple antenna array.

The method according to an embodiment of the present disclosure can apply to a base station configured with horizontal-uniform-linear-array antennas to fast obtain downlink horizontal channel direction information from the base station to the terminal. The method can also apply to a base station configured with uniform-square-array antennas to fast obtain downlink three-dimensional channel direction information from the base station to the terminal.

In addition, the method according to an embodiment of the present disclosure can apply to a base station configured with a multiple-antenna array to fast obtain downlink channel direction information from the base station to the terminal. The method can also apply to a terminal configured with a multiple-antenna array to fast obtain uplink channel direction information from the terminal to the base station. Furthermore, according to the method, channel direction information of different downlink multi-paths of a same terminal can be estimated.

At block 101, an initialization operation is performed. A detection region is a sub-space of a channel direction space. Multiple detection regions can collectively form the channel direction space. The detection region includes at least two levels of detection regions. Each level of the detection regions includes at least one detection region. Spatial granularities of detection regions of a same level can be same. Spatial granularities of detection regions of different levels are different.

In direction regions with different spatial granularity levels, through transmission beam forming, the base station performs directional transmission of the primary detection signal of Channel direction information (CDI) and the assistant detection signal of the CDI to the terminal. The primary detection signal of the CDI and the assistant detection signal of the CDI respectively includes, but are not limited to, a synchronization signal, a cell-specific reference signal (CRS), a channel state information reference signal (CSI-RS).

At block 102, a process of transmitting the primary detection signal in the detection regions of the different levels to detect the CDI includes procedures as follows. The base station transmits the primary detection signal and corresponding configuration information in a detection region of a current level. The terminal receives the primary detection signal, and feeds the signal receiving characteristic of the primary detection signal back to the base station. According to the signal receiving characteristic of the primary detection signal, the base station receives the signal receiving characteristic of the primary detection signal, and determines an optimal detection region of the current level. Preferably, the detection may be sequentially performed from a wide granularity.

A preferable implement for transmitting the primary detection signal in the detection region of the current level includes procedures as follows. The base station determines a level of at least one detection region to be detected, selects at least one detection region in the level to be detected to constitute a detection set. The base station notifies configuration information of the detection set to the terminal, and transmits the primary detection signal of the CDI in each of the at least one detection region in the detection set through transmission beam forming. The terminal receives the primary detection signal of the CDI, and feeds the signal receiving characteristic back to the base station.

The detection set includes multiple detection regions whose channel directions are neighbor to each other. The configuration information of the detection set includes information such as levels of the detection regions, the numbers of the detection regions, indices of the detection regions, a time-frequency resource location of the primary detection signal, a multiplexing method of the primary detection signal, and an adopted sequence of the primary detection signal.

The base station generates beam forming with a designated direction in a horizontal direction and/or a vertical direction by use of multiple antennas to transmit the primary detection signal of the CDI. The beam forming with the designated direction includes a beam forming whose center direction of the main lobe is directed to a center direction of each detection region, and an angle bandwidth of a main lobe of the beam covers each detection region.

At block 103, the procedure of transmitting the assistant detection signal to perform the differential detection of the CDI includes steps 1)-4) as follows 1) The base station determines a detection region in the detection set as an assistant detection region, and the differential detection is performed in the assistant detection region.

Preferably, at block 102, the base station selects a detection region in which receiving gain of the primary detection signal fed back from the terminal is highest as the optimal detection region, and performs the differential detection in the optimal detection region.

2) Configuration information of the assistant detection signal is notified to the terminal.

Preferably, the configuration information of the assistant signal includes information includes such as time-frequency resource locations on which the assistant detection signal is transmitted, the number of the time-frequency resources, sequence configuration adopted by the assistant detection signal.

3) The base station transmits the assistant detection signal on the assistant detection region.

Preferably, transmission beam beaming of the assistant detection signal has a designated direction.

Preferably, when the base station configures a two-dimensional antenna array, the transmission beam forming of the assistant detection signal may be three-dimensional transmission beam forming.

Preferably, a valid detection range of the assistant detection signal is a coverage region of a main lobe of the primary detection signal of an original detection region (i.e., a corresponding optimal detection region).

Preferably, ways of the transmission beam forming respectively corresponding to the primary detection signal and the assistant signal are different. The assistant detection signal provides the differential information based on the primary detection signal. In a range of the detection region, characteristics of a group of the primary detection signal and the assistant detection signal received by terminals with different CDI are different. The base station may obtain accurate CDI of a channel of a terminal by distinguishing signal receiving characteristics of the primary detection signal group and the assistant detection signal group fed back by the terminal.

The signal receiving characteristic includes, but is not limited to, information such as a receiving gain of the primary detection signal, a noise-signal ratio and a ratio of receiving gains.

4) The terminal receives the assistant detection signal, and feeds the signal receiving characteristic back to the base station.

Preferably, the terminal quantifies the signal receiving characteristic through a fixed codebook, and feeds a quantized result back to the base station.

Preferably, the fixed codebook may adopt a uniform quantization codebook, or may adopt a non-uniform quantization codebook according to probability distribution of the signal receiving characteristic.

At block 104, the procedure of adjusting the channel direction information according to the signal receiving characteristic of the detection of the assistant detection signal includes procedures as follows.

1) The Base Station Respectively Revises the CDI Corresponding to Different Terminals.

In particular, according to the signal receiving characteristic of the primary detection signal and the signal receiving characteristic of the assistant detection signal fed back from the terminal, the base station determines a CDI detection error. Combining a direction of the primary detection signal with the CDI detection error, the base station adjusts the CDI of the channel of the terminal.

Preferably, according to the differential information reflected from the signal receiving characteristic of the assistant detection signal, in the range of the detection region, the base station determines a CDI detection error of the CDI relative to the designated direction of the primary detection signal. Comparing with the CDI of the channel of the terminal obtained according to the primary detection signal, the adjusted CDI is more accurate, and more reliable.

2) The Base Station Determines Whether Detection of a Next Level is to be Performed.

The method further includes procedures as follows. When the detection of the next level is to be performed, according to the adjusted CDI of the channel of the terminal, the base station determines a detection set of the next level, and starts channel direction detection of the new level. When the next level of the detection is not to be performed, the base station finishes the detection process, and takes the adjusted CDI of the channel of the terminal as the CDI of the channel of the terminal, and notified the related information to the terminal through a control signaling.

According to a process shown in FIG. 1, the primary detection signal and the assistant detection signal are sequentially transmitted in a time domain. In another example, the primary detection signal and the assistant detection signal may be transmitted at the same time. In this way, the primary detection signal and the assistant detection signal are transmitted on different frequency resources. In order to obtain reliable performance, the frequency resources respectively used by the primary detection signal and the assistant detection signal are less than a coherent bandwidth of the channel. Since the different frequency resources are used, a transmitter may transmit the primary detection signal and the assistant detection signal on every detection region among the detection set. A receiver may receive the primary detection signal and the assistant detection signal at the same time. The receiver may measure the assistant detection signal on the detection region on which the receiving gain of the primary detection signal is highest, and performs feedback. When the method that the primary detection signal and the assistant detection signal is transmitted at the same time is adopted, detection time is reduced, but additional frequency resources are required. Thus, in a practical system design, which method is adopted may be determined according to requirements.

Generally, when the level of the detection region has reached a precision requirement pre-determined by the system, the base station may finish the detection process.

Preferably, a spatial granularity of an ultimate detection region may be determined in accordance with factors such as a spatial resolution of a beam of an antenna array and a moving speed of the terminal. Meanwhile, before the detection region of a highest level is reached, the detection process may finish. When the number of antennas is larger, the space resolution of the beam is higher, and the spatial granularity of the ultimate detection region could be thinner. When the number of antennas is smaller, the spatial resolution of the beam could be lower, and the spatial granularity of the ultimate detection region could be wider. When the moving speed of the terminal is lower, the spatial granularity of the ultimate detection region could be thinner. When the moving speed of the terminal is higher, the spatial granularity of the ultimate detection region could be wider.

Figure 5:
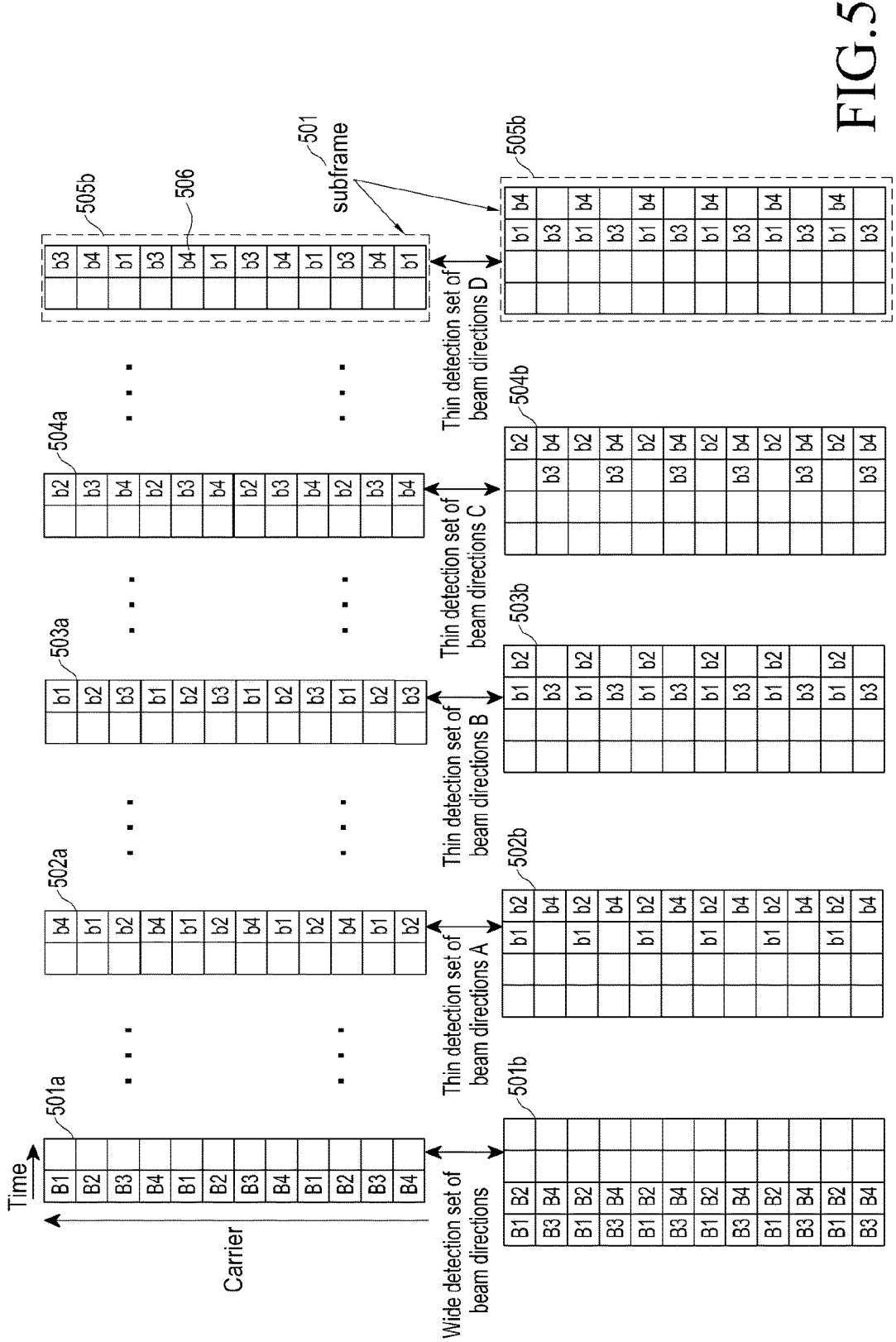
FIG. 5 is a schematic diagram illustrating a method for mapping time-frequency resources among detection sets of different levels according to an embodiment of the present disclosure.

According to a method for obtaining channel direction information based on detection as shown in FIG. 5, two detail embodiments are illustrated.

Embodiment 1

Figure 2A:
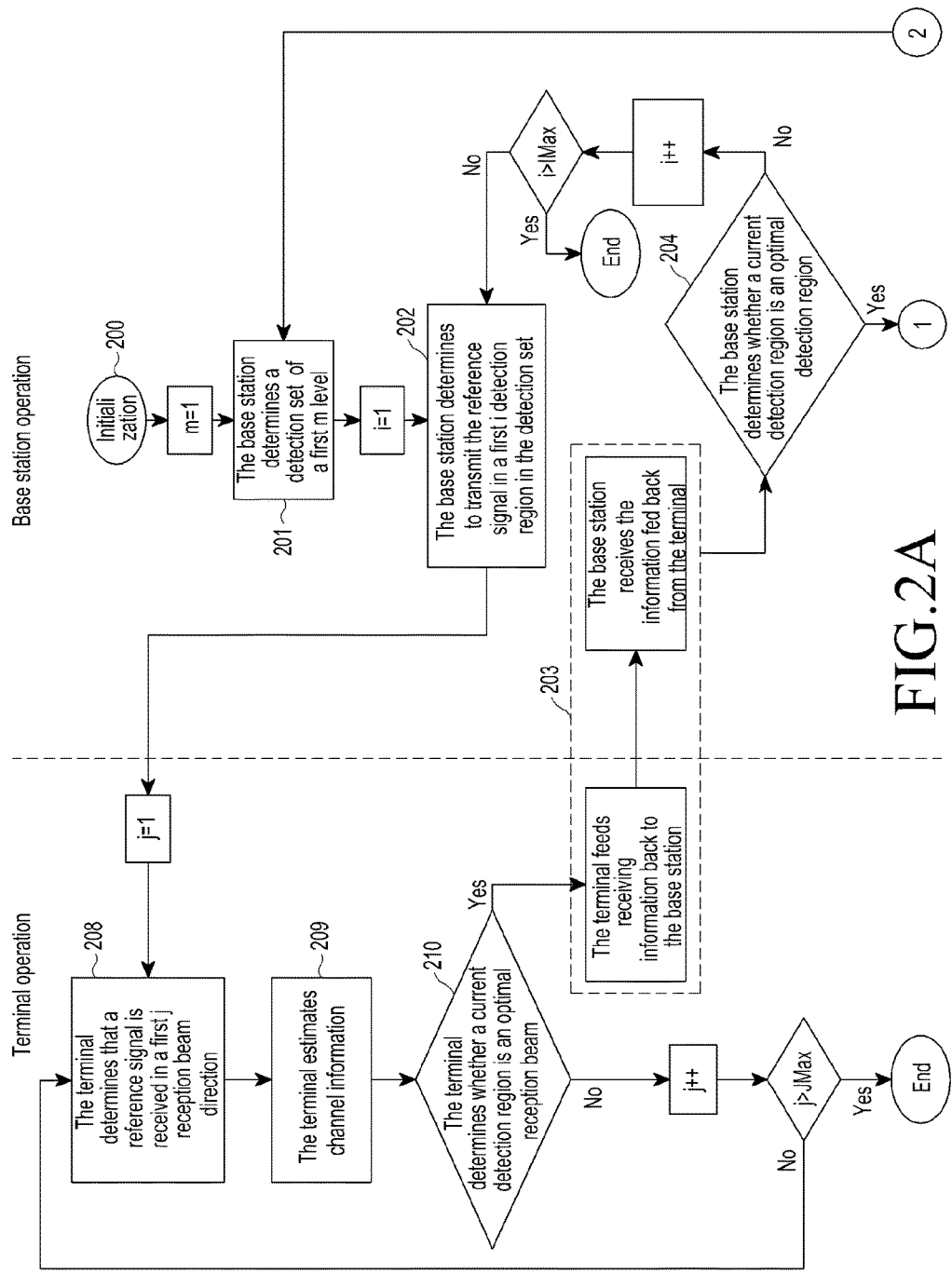
FIG. 2A and FIG. 2B are flowcharts illustrating a method for obtaining channel direction information based on detection according to an embodiment of the present disclosure.
Figure 2B:
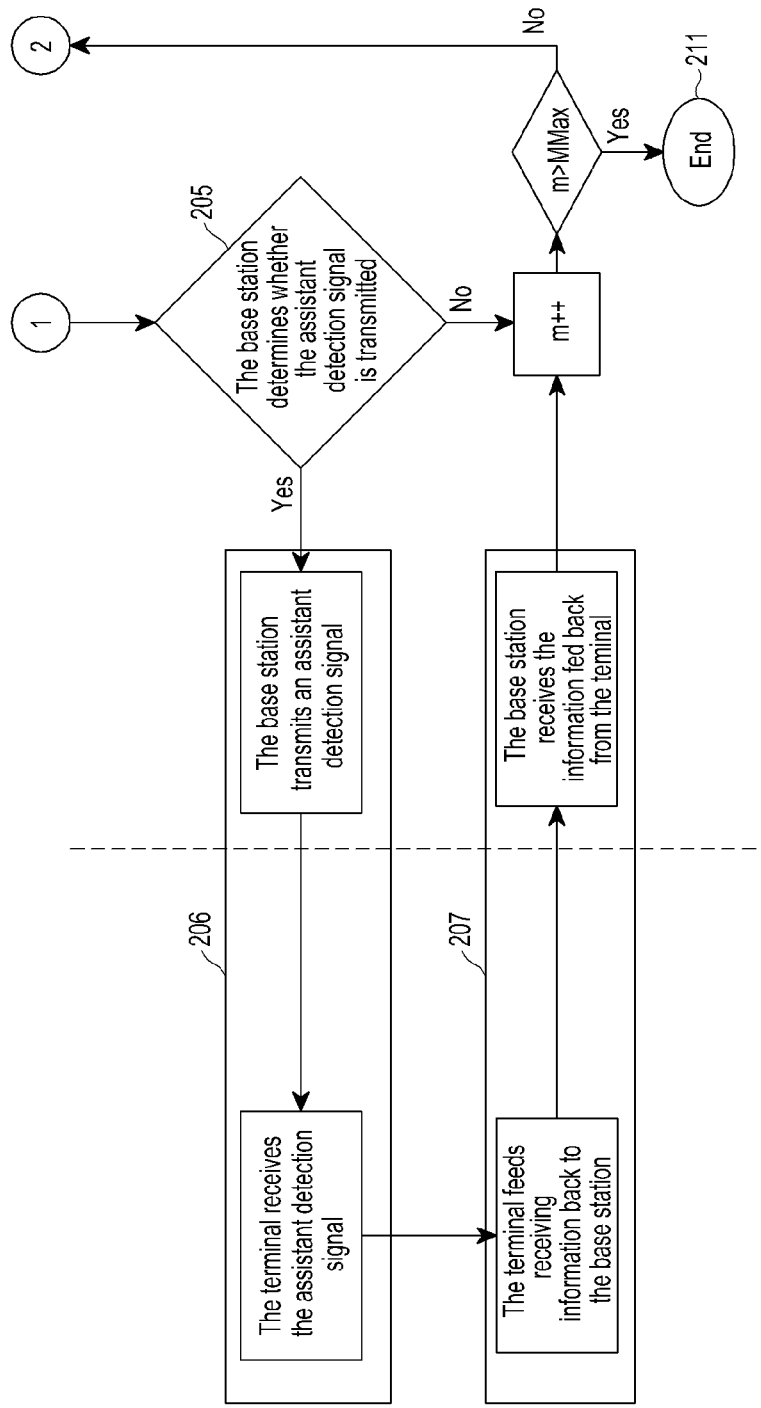

In the embodiment, horizontal-uniform-linear-array antennas configured by a base station are taken as an example. FIG. 2A and FIG. 2B are flowcharts illustrating a method for obtaining channel direction information based on detection according to an embodiment of the present disclosure.

As shown in FIGS. 2A and 2B, at block 200, the base station performs an initialization operation. The base station divides all the channel directions into multiple levels. A spatial granularity of a detection region of a lower level is wider than a spatial granularity of a detection region of a higher level. Spatial granularities of detection regions of a same level may be same with each other, and uniformly cover each channel direction.

Figure 3:
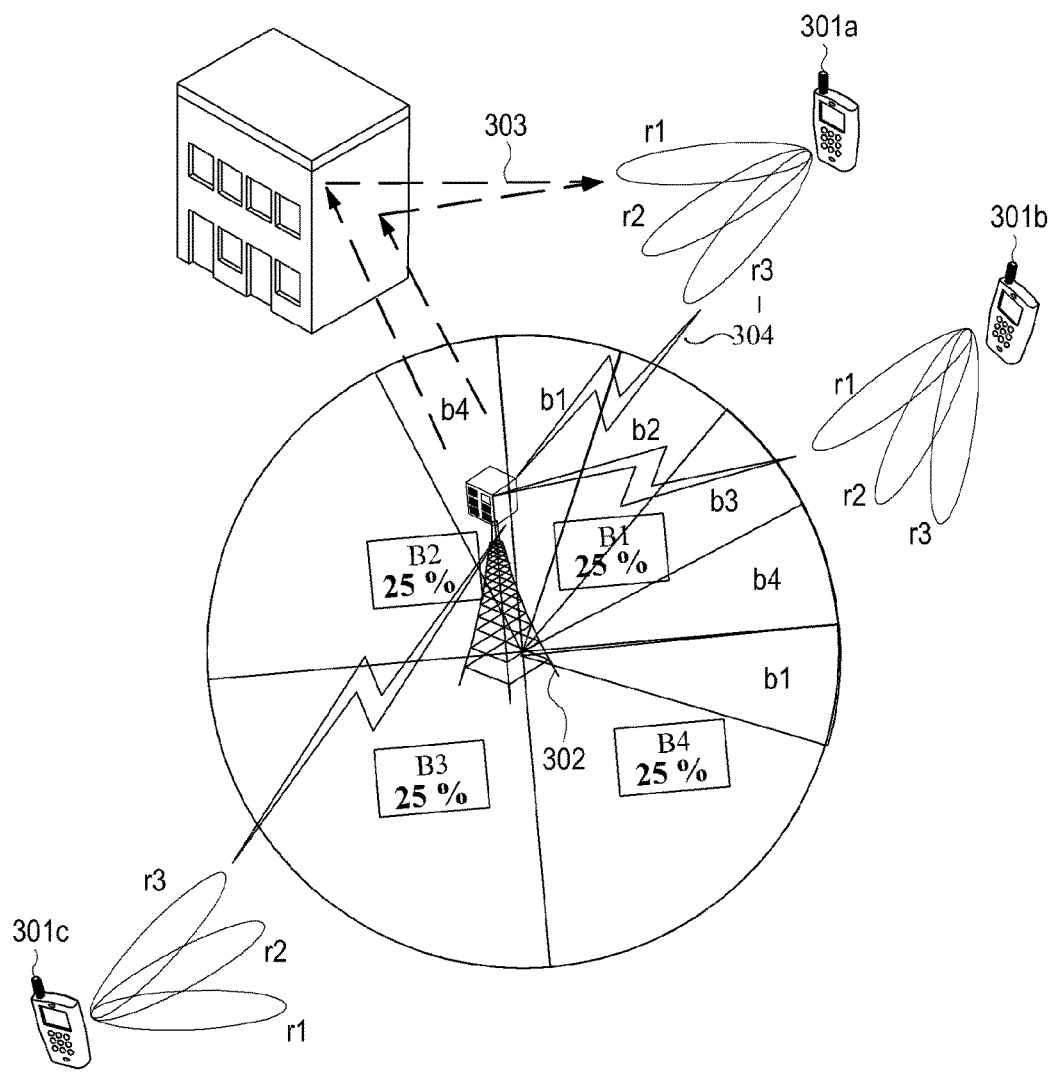
FIG. 3 is a schematic diagram illustrating a method for obtaining channel direction information based on detection according to an embodiment of the present disclosure.

FIG. 3 is a schematic diagram illustrating a typical application scenario according to an embodiment of the present disclosure. Through narrow beam forming generated by use of multiple antennas, a base station 302 transmits a signal to terminals on different horizontal channel directions in a serving cell (301a, 301b and 301c as shown in the figure). In order to conveniently perform detection of channel CDI of a terminal, all the horizontal channel directions are divided into two levels, wherein channel directions of a first level includes four detection regions with a wide spatial granularity, B1, B2, B3, B4 each of which covers ¼ coverage of a cell.

Each detection region of the first level is respectively divided into four detection regions of a thinner spatial granularity, b1, b2, b3, b4 each of which covers 1/16 coverage of a cell.

Referring back to FIGS. 2A and 2B, at block 201, the base station determines a level of at least one detection region to be detected, and selects at least one detection region of a same spatial granularity in the specific level to constitute a channel detection direction set, notifies configuration information of the channel detection direction set to the terminal via a control signaling. The terminal receives the signaling transmitted from the base station, and obtains the configuration information of the detection set.

Figure 4:
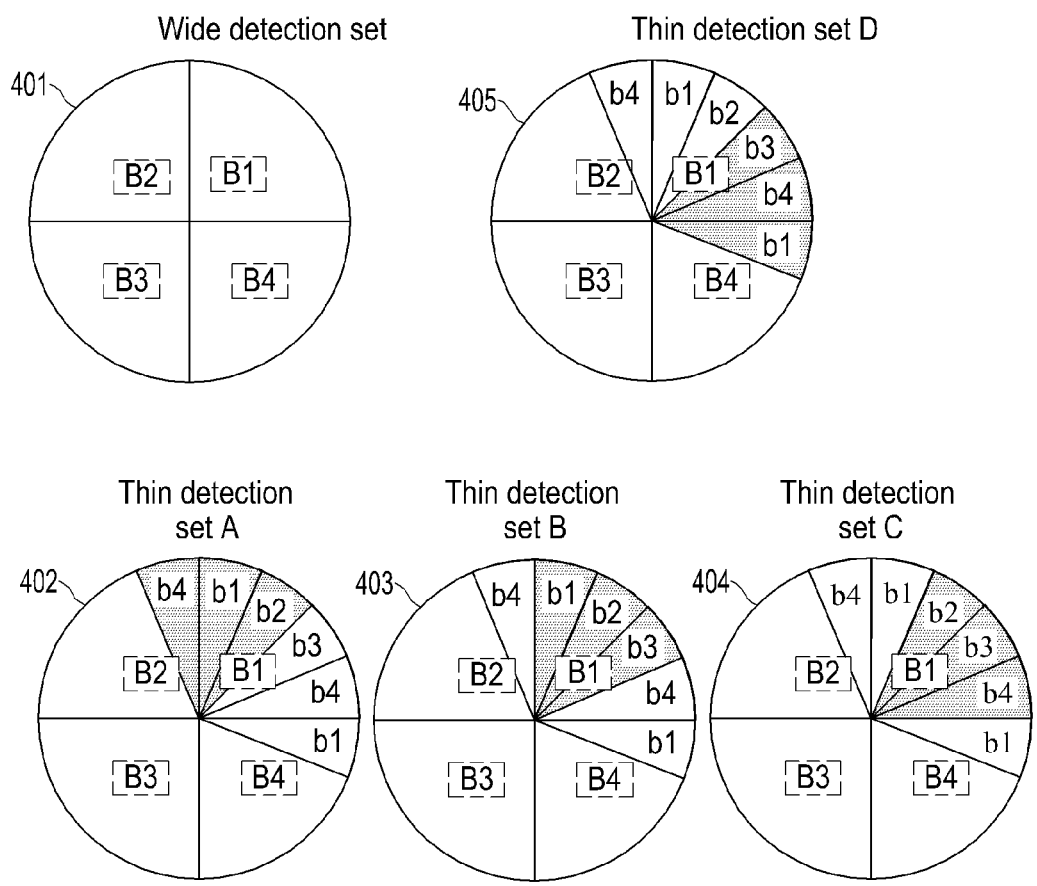
FIG. 4 is a schematic diagram illustrating a method for dividing detection regions of multiple levels according to an embodiment of the present disclosure.

In general, a detection principle of the base station is from a detection region of a low level to a detection region of a high level. The level of the detection region to be detected corresponds to a detection region which has a lowest level and is not detected. As shown in FIG. 4, the base station firstly detects a detection set of a first level, and then detects a detection set of a second level. In the embodiment of the present disclosure, an initial value of a level m of the detection region is configured with 1. When a current level has been processed, the value of m is increased in sequence.

As shown in FIG. 4, a detection set of a first level includes four wide detection regions, B1, B2, B3 and B4 in 401. A detection set of a second level includes, but is not limited to, four thin detection sets, A, B, C and D in FIG. 4. Each of the detection sets of the second level A, B, C and D respectively include three thin detection regions. The detection set A (as shown in 402) includes b4 covered by the region B2, b1 and b2 covered by the region B1. The detection set B (as shown in 403) includes b1, b2 and b3 covered by the region B1. The detection set C (as shown in 404) includes b2, b3 and b4 covered by the region B1. The detection set D (as shown in 405) includes b3, b4 covered by the region B1, and b1 covered by the region B4.

Preferably, the configuration information of the detection set includes a level of the primary detection signal of the CDI, the number of primary detection signals of the CDI, an index of the primary detection signal of the CDI, a location where a time-frequency resource of the primary detection signal of the CDI locates, a multiplexing method of the primary detection signal of the CDI, a sequence adopted by the primary detection signal primary detection signal of the CDI.

Preferably, the primary detection signals of the CDI of multiple detection regions in a same detection set may perform multiplexing in coherent channel resources. A multiplexing method includes at least one of a frequency-division multiplexing, a time-division multiplexing and a code-division multiplexing.

A multiplexing method of primary detection signals of the CDI of the four wide detection regions on time-frequency resources are provided as shown in FIG. 5.

In a sub-frame 501a, the primary detection signals of the CDI are mapped into four neighbor carriers in a same time slot in a frequency-division multiplexing way.

In a sub-frame 501b, the primary detection signals of the CDI are mapped into neighbor carriers in neighbor time slots in a time-division multiplexing way.

As shown in FIG. 4, a method of mapping primary detection signals of the CDI of the detection set A of the second level are illustrated in sub-frames 502a and 502b. A method of mapping CDI primary detection signals of the detection set B of the second level are illustrated in sub-frames 503a and 503b. A method of mapping CDI primary detection signals of the detection set C of the second level are illustrated in sub-frames 504a and 504b. A method of mapping CDI primary detection signals of the detection set D of the second level are illustrated in sub-frames 505a and 505b.

Configuration of the detection set may be pre-defined by the system, may be selected by the base station, and is notified to the terminal. The terminal obtains configuration information so as to receive each CDI primary detection signal in a correct location of a time-frequency resource.

Referring back to FIGS. 2A and 2B, at block 202, the base station transmits a CDI primary detection signal of each detection region in the detection set through transmission beam forming. In the embodiment, each detection region in the detection set is indexed with i, an initial value of i is equal to 1, and when a condition is satisfied, (i+1) is performed.

A terminal operation corresponding to block 202 is at block 208. The terminal receives the primary detection signal of the CDI transmitted from the base station through multiple reception beams of different directions, wherein each reception beam is numbered with j, an initial value of j is equal to 1, and when a condition is satisfied, (j+1) is performed.

Preferably, the base station transmits beam forming signal to a designated direction in a horizontal direction through multiple antennas, wherein a center of a main lobe points to a center direction of the detection region. An angle between the center direction of the detection region and a normal direction of the antenna array of the base station is $\theta_{prob}$. The CDI of the downlink channel from the base station to the center of the detection region is:

$$\hat{h} = \left[1, e^{j2\pi \sin(\theta_{prob})d/\lambda}, \ldots, e^{j2\pi \frac{d}{\lambda}(N-1)\sin(\theta_{prob})d/\lambda}\right]^T,$$

where d is a distance between antennas, λ is a wavelength of a carrier, N is the number of the transmission antennas of the base station at the direction, and superscript T indicates a transposition operation.

In this condition, horizontal transmission beam forming of the base station is:

$$w = \hat{h} = \left[1, e^{j2\pi \sin(\theta_{prob})d/\lambda}, \ldots, e^{j2\pi \frac{d}{\lambda}(N-1)\sin(\theta_{prob})d/\lambda}\right]^T$$

When the CDI of the channel of the terminal locates in the center of the detection region, a gain of the primary detection signal of the CDI received by the terminal is strongest.

A bandwidth of a main lobe of the transmission beam forming of the primary detection signal of the CDI may be matched with the spatial granularity of the detection region. A possible implementation method includes: when the base station transmits the primary detection signal of the CDI of the thin detection region, the transmission beam forming with a thin main lobe is generated through many antennas, when the base station transmits the CDI primary detection signal of the wide detection region, the transmission beam forming having a wide main lobe is generated through less antennas. For example, a first ¼ part of transmission antennas are used to generate the transmission beam forming having a wide main lobe angle. Another possible implementation method includes: when the base station performs detection in detection regions with different spatial granularities, all antennas are used, a weighting value of each antenna is adjusted to compose transmission beam forming with different angle bandwidths.

At block 209, the terminal estimates channel related information.

At block 210, the terminal determines a best reception beam. When the best reception beam is not determined, (j+1) is performed, and the procedure returns to block 208. Repeat the block 210 until the best reception beam is determined.

FIG. 3 is taken as an example. The terminal selects one of r1, r2 and r3 as the best reception beam. A selection method includes taking the reception beam having the strongest receiving gain as the best reception beam. Thus, the best reception beam of the terminal 301a is r3, the best reception beam of the terminal 301b is r1, and the best reception beam of the terminal 301c is r3.

Referring back to FIGS. 2A and 2B, at block 203, the terminal feeds a signal receiving characteristic of the CDI primary detection signal of each detection region back to the base station.

The signal receiving characteristic may be a signal receiving gain. The terminal feeds the signal receiving gain of the CDI primary detection signal back to the base station. When an angle between true CDI of the channel of the terminal and a normal direction of the antenna array of the base station is $\theta_{true}$, a true channel direction is:

$$h = \left[1, e^{j2\pi \sin(\theta_{true})d/\lambda}, \ldots, e^{j2\pi \frac{d}{\lambda}(N-1)\sin(\theta_{true})d/\lambda}\right]^T$$

The terminal may quantize the complex signal receiving gain $g=h^T w$ through a fixed codebook, and may report a quantization result to the base station.

Figure 6:
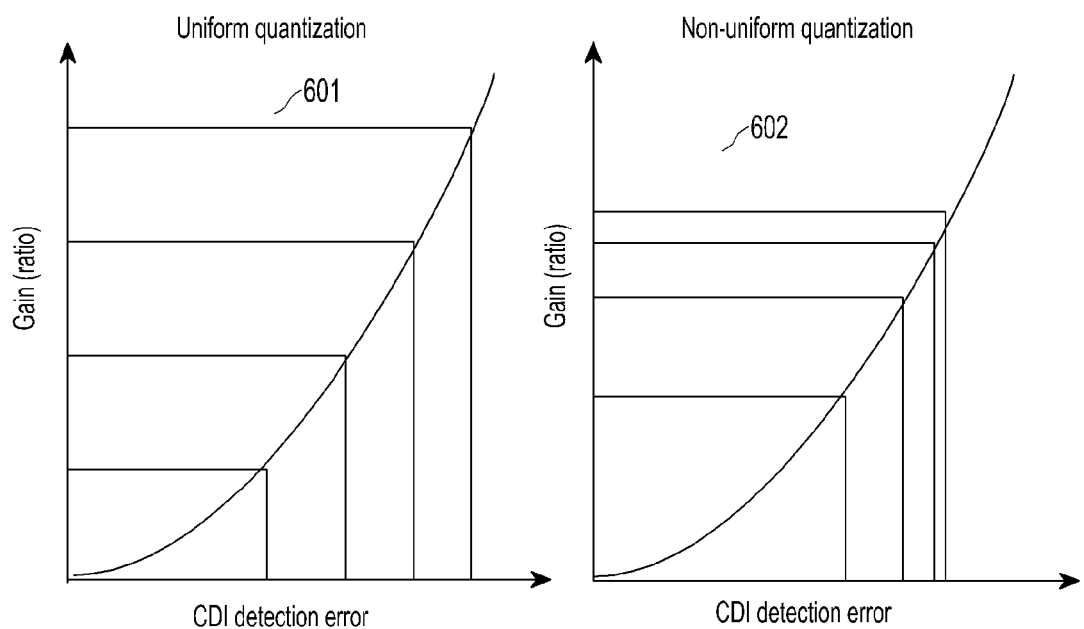
FIG. 6 is a schematic diagram illustrating uniform quantization of a gain ratio and non-uniform quantization of a gain ratio according to an embodiment of the present disclosure.

FIG. 6 is taken as an example. Both the terminal and the base station know a codebook of the quantized gain. The detail codebook may be a uniform codebook 601, a non-uniform codebook 602, or another codebook. According to a dynamic range of the receiving gain, the non-uniform codebook 602 may be determined and optimized based on a target such as minimum average quantization error.

Referring back to FIGS. 2A and 2B, at block 204, according to the signal receiving characteristic of the primary detection signal of the CDI fed back from the terminal, the base station determines whether a current detection region is an optimal detection region in the current detection set. When the optimal detection region is not determined, (i+1) is performed, and the procedure returns to block 202. Repeat the block 204 until the optimal reception beam is determined.

FIG. 4 is taken as an example. When a procedure of detecting a detection set of the first level finishes, the base station obtains the optimal detection region in the detection set, i.e., the detection region where the channel CDI of the terminal possibly aligns Referring back to FIGS. 2A and 2B, at block 205, the base station determines whether the assistant detection signal is to be transmitted. When the assistant detection signal is to be transmitted, blocks 206-207 are performed. Otherwise, block 211 is performed.

When the base station requires a higher precision of the CDI, blocks 206-207 are performed. Through the assistant detection signal, the differential detection is performed in the optimal detection region to make the obtained channel CDI of the terminal more precise. Thus, the detection set of the second level is decreased, or is directly avoided. When the base station reaches a precision requirement of the CDI, the base station may not transmit the assistant detection signal, and then block 211 is performed At block 206, the base station configures a signaling in the current optimal detection region to notify the terminal to prepare receiving the assistant detection signal, and transmits the assistant detection signal in the current optimal detection region.

Preferably, beam forming methods corresponding to the assistant detection signal and the primary detection signal in the current optimal detection region are different. Based on the primary detection signal, the assistant detection signal provides differential CDI information of the different terminals in the optimal detection region. The base station combines the signal receiving characteristic of the primary detection signal with the signal receiving characteristic of the assistant detection signal to distinguish precise CDI of each terminal in the current optimal detection region.

It is assumed that the transmission beam forming of the primary detection signal is:

$$w1 = \begin{bmatrix} 1, e^{j2\pi\frac{d}{\lambda}\sin(\theta_{prob})}, \ldots e^{j2\pi(\frac{N}{2}-1)\sin(\theta_{prob})d/\lambda}, \\ e^{j2\pi(\frac{N}{2}+1)\sin(\theta_{prob})d/\lambda} \ldots e^{j2\pi(N-1)\sin(\theta_{prob})d/\lambda} \end{bmatrix}^T,$$

and, the transmission beam forming of the assistant detection signal is:

$$w2 = \begin{bmatrix} 1, e^{j2\pi\frac{d}{\lambda}\sin(\theta_{prob})}, \ldots e^{j2\pi(\frac{N}{2}-1)\sin(\theta_{prob})d/\lambda}, \\ -e^{j2\pi(\frac{N}{2}+1)\sin(\theta_{prob})d/\lambda} \ldots -e^{j2\pi(N-1)\sin(\theta_{prob})d/\lambda} \end{bmatrix}^T,$$

where the sign of the first half of the assistant detection signal is the same as that of the transmission beam forming of the primary detection signal, and the sign of the latter half is contrary to that of the assistant detection signal. The receiver may calculate a complex gain of the assistant detection signal.

At block 207, according to the signal receiving characteristic of the assistant detection signal reported by the terminal, the base station determines that at least one detection region of a next level is taken as a new detection set, (m+1) is performed, and the procedure returns to block 201.

Blocks 202 and 206 may be performed by the base station at the same time. That is, the primary detection signal and the assistant detection signal may be transmitted at the same time. The primary detection signal and the assistant detection signal may be transmitted via different carriers in a coherent bandwidth. Before the terminal performs feedback, complex gains respectively corresponding to the primary detection signal and the assistant detection signal are obtained.

Figure 7:
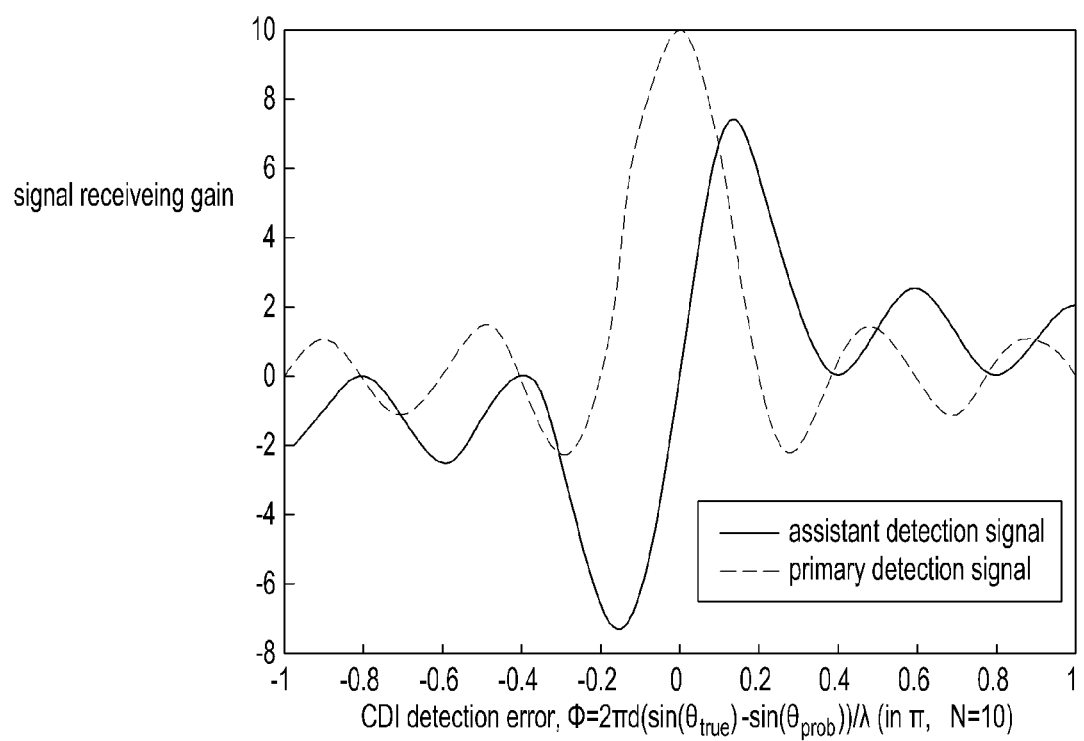
FIG. 7 is a schematic diagram illustrating a relationship between a CDI detection error and a signal receiving gain according to an embodiment of the present disclosure.

The base station combines the signal receiving characteristic of the primary detection signal with the signal receiving characteristic of the assistant detection signal to distinguish detail CDI. For example, FIG. 7 is a schematic diagram illustrating a signal receiving gain when a terminal locates in different horizontal channel directions in a cell. The number N of the transmission antennas of the base station is equal to 10. It can be seen from the figure that, when the center of the detection region $\theta_{prob}$ is taken as a zero point and true channel directions of the terminal are different to $\theta_{prob}$, the CDI detection error exists. Complex receiving gains of the primary detection signal and the assistant detection signal corresponding to different CDI detection errors show difference, especially when CDI detection error lies in a valid spatial resolution region (an angle bandwidth of a main lobe of the transmission beam forming) of the base station, i.e., the detection error of the channel direction is less than 0.2.

Figure 8:
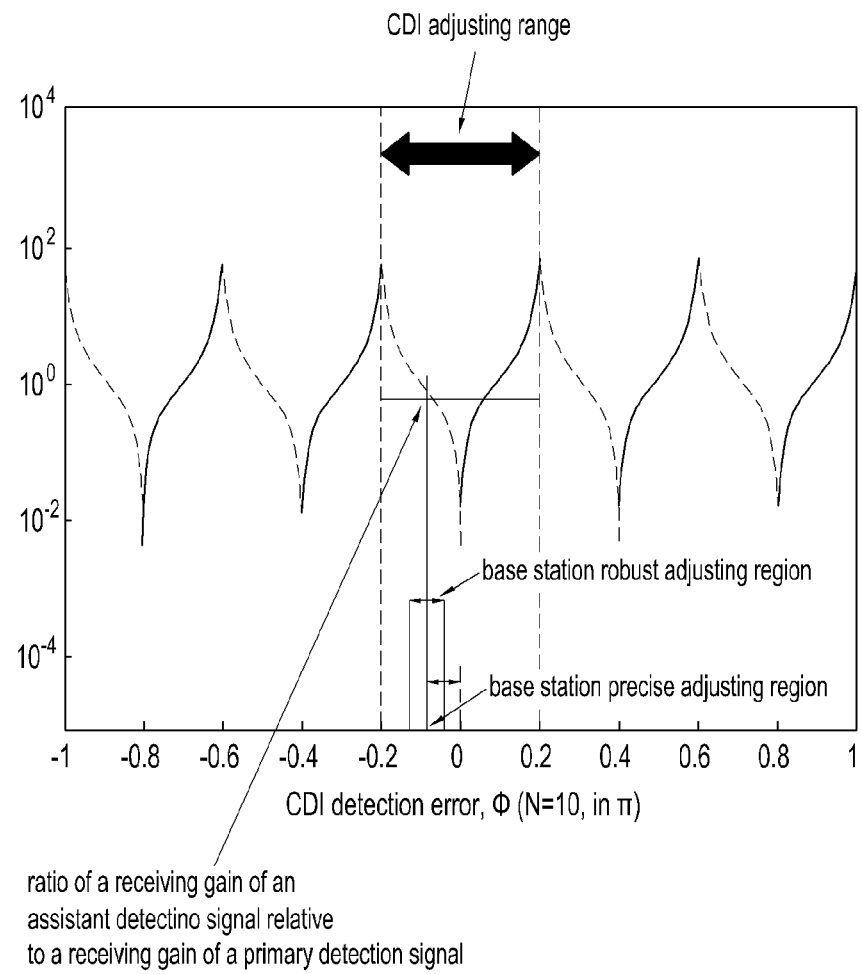
FIG. 8 is a schematic diagram illustrating a relationship between a CDI detection error and a signal receiving gain according to an embodiment of the present disclosure.

As shown in FIG. 8, when an absolute value of the CDI detection error is less than 0.2 and the CDI detection error is a positive number, a ratio of a receiving gain of the primary detection signal and a receiving gain of the assistant detection signal is a real number. When an absolute value of the CDI detection error is less than 0.2 and the CDI detection error is a negative number, a ratio of a receiving gain of the primary detection signal and a receiving gain of the assistant detection signal is an imaginary number. When the absolute value of the CDI detection error is increased, a ratio of receiving gains is increased. Thus, for different terminals in a range of detection regions (−0.2, 0.2), the assistant detection signal provides the differential information of the channel CDI based on the primary detection signal.

The terminal quantizes the complex ratio of the receiving gains, and feeds the ratio back to the base station. Afterwards, according to the ratio fed back from the terminal and a relationship between the ratio and the CDI detection error, the base station may determine the CDI detection error of the terminal. Finally, according to the determined CDI detection error, the base station performs adjustment based on the designated direction of the primary detection signal to make the obtained CDI of the terminal more precise.

When the detection of a next level is to be performed, the base station takes a detection region of the next level covering the direction corresponding to the adjusted channel CDI of the terminal as a new optimal detection region. In order to reduce impact of factors such as a reception noise suffered by the CDI primary detection signal, interference suffered by the CDI primary detection signal, a quantization error suffered by the CDI primary detection signal and a moving speed of the terminal, the base station may take multiple detection regions neighboring to the new optimal detection region as a new detection set. The multiple neighboring detection regions may be selected in accordance with a range of a robust adjustment region of the base station shown in FIG. 8. A selection principle includes taking a precise adjustment value of the base station, i.e., an adjusted channel CDI of the base station as a base while allowing a tolerable error to enhance robustness of the CDI obtained by the base station.

In general, when the moving speed of the terminal is high, timeliness of the CDI is bad, the estimation precision requirement is low. Thus, multiple neighboring detection regions are added into the detection set based on the new optimal detection region. FIG. 4 is taken as an example. The detection set of the second level may include three thin detection regions. When the adjusted channel CDI of the terminal locates in the thin detection region b1 covered by the detection region B1, the detection set of the second level may select A which includes two neighbor directions, i.e., the thin detection region b4 covered by a detection region B2 and the thin detection region b2 covered by a detection region B1.

Preferably, when the moving speed of the terminal is low and the receiving noise and the interference of the primary detection signal of the CDI is low, the base station may directly take the adjusted CDI after the first level is performed as ultimate channel CDI of the terminal. Thus, the detection of the second level is not performed so as to achieve fast CDI acquisition.

Referring back to FIGS. 2A and 2B, at block 211, the base station selects a center of a detection region in the current detection set as the channel CDI of the terminal, and notifies the related information to the terminal via a control signaling.

The terminal receives the information of the ultimate channel CDI configured by the base station.

Embodiment 2

In the embodiment, a two-dimension antenna array configured by the base station is taken as an example.

Referring back to FIGS. 2A and 2B, at block 200, the base station performs an initialization operation. The base station divides all the channel directions into multiple levels. A spatial granularity of a detection region of a low level is wide. A spatial granularity of a detection region of a high level is thin. Spatial granularities of detection regions of a same level are same with each other, and uniformly cover each channel direction.

Figure 9:
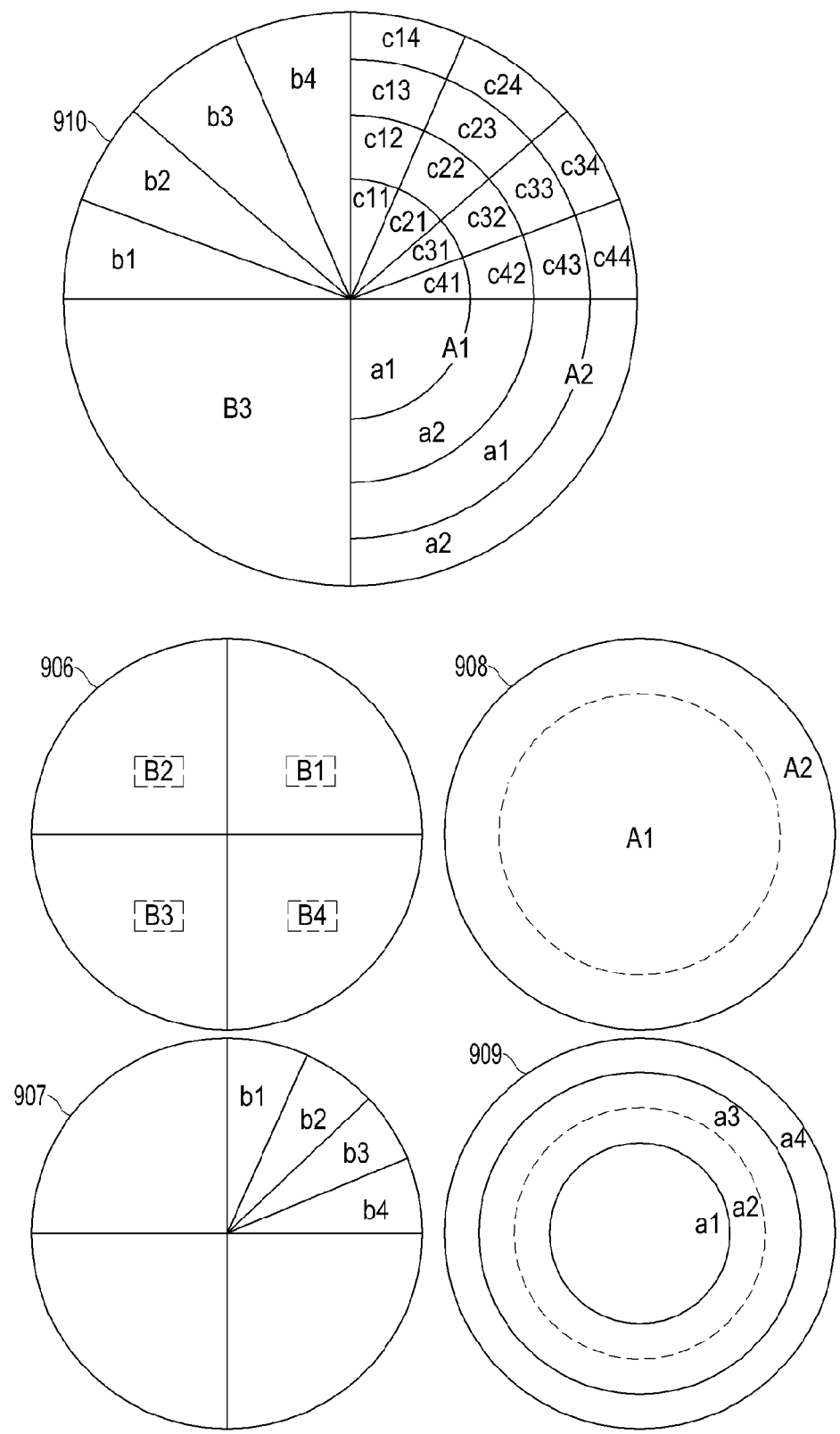
FIG. 9 is a schematic diagram illustrating a method for dividing three-dimensional detection regions of multiple levels according to an embodiment of the present disclosure.

As shown in FIG. 9, the base station divides channel directions into two levels in a horizontal direction. As shown in sub-FIG. 906, the direction regions of the first level includes four detection regions of a wide spatial granularity, B1, B2, B3, B4 each of which covers ¼ coverage of a cell. As shown in sub-FIG. 907, each of the first detection regions is respectively divided into four detection region of a thinner spatial granularity, b1, b2, b3, b4 each of which covers 1/16 coverage of a cell. The base station divides channel directions into two levels in a vertical direction. In detail, as shown in sub-FIG. 908, the direction regions of the first level includes two detection regions of the wide spatial granularity, A1, A2 each of which covers ½ coverage of a cell. As shown in sub-FIG. 909, each of the detection regions of the first level is divided into two detection regions of the thin spatial granularity, a1, a2, a3 and a4 each of which covers ¼ coverage of a cell. In a three-dimensional space, a division result of a part of channel directions is as shown in sub-FIG. 910, a detection region of a thinnest level is divided into c11, c12, c13, c14, c21, c22, c23, c24, c31, c32, c33, c34, c41, c42, c43 and c44.

Referring back to FIGS. 2A and 2B, at block 201, the base station determines a level of at least one detection region to be detected, and selects at least one detection region of a same spatial granularity in the level to constitute a detection set, notifies configuration information of the detection set to the terminal via a signaling. The terminal receives the signaling transmitted from the base station, and obtains the configuration information of the detection set.

Each detection region of a three-dimensional channel direction is determined according to combination of a horizontal detection region and a vertical detection region. FIG. 9, as an example, illustrates a detection set of a first level that includes (B1, A1), (B2, A1), (B3, A1), (B4, A1), (B1, A2), (B2, A2), (B3, A2), (B4, A2).

Based on the detection set of the first level, the base station determines the detection set of a second level. In order to enhance robustness, the base station may select multiple detection regions to form the detection set of the second level. After the detection is performed through the primary detection signal of the first level and the assistant detection signal, if it is assumed that the adjusted CDI of the terminal obtained by the base station locates in a thin detection region (b2, a2) in sub-figures 907 and 909 in FIG. 9, i.e., c22 in sub-FIG. 910, the detection set of the second level may include detection regions (b1, a1), (b1, a2), (b1, a3), (b2, a2), (b2, a2), (b2, a3), (b3, a1), (b3, a2), (b3, a3), i.e., three-dimensional detection regions as shown in sub-FIG. 910, c11, c12, c13, c21, c22, c23, c31, c32, c33. In this condition, the base station selects two neighboring channel directions in the horizontal direction and the vertical direction for adjusting CDI of the terminal to enhance robustness.

At block 202, the base station transmits a CDI primary detection signal in each detection region among the detection set through transmission beam forming.

A terminal operation corresponding to block 202 is at block 208. The terminal receives the CDI primary detection signal transmitted from the base station through multiple reception beams of different directions.

Preferably, the base station generates three-dimensional transmission beam forming of a designated direction in a horizontal direction and a vertical direction through multiple antennas of a Uniform Planar Array (UPA), wherein a center of a main lobe points to a center direction of the three-dimensional detection region. An angle between the center direction of the detection region and a normal direction of the horizontal antenna of the base station is $\theta_{prob}$. An angle between the center direction of the detection region and a normal direction of the vertical antenna of the base station is $\phi_{prob}$. The CDI of a downlink channel from the base station to the center of the detection region is:

$$\hat{h} = vec\left(\left[1, e^{j2\pi \sin(\theta_{prob})d/\lambda}, \ldots e^{j2\pi \frac{d}{\lambda}(N-1)\sin(\theta_{prob})d/\lambda}\right]^T \right.$$
$$\left.\left[1, e^{j2\pi \sin(\varphi_{prob})d/\lambda}, \ldots e^{j2\pi \frac{d}{\lambda}(N-1)\sin(\varphi_{prob})d/\lambda}\right]\right)$$

where vec( ) indicates a stretch operation of a matrix, i.e., changing a matrix into a vector. In this condition, the transmission beam forming of the base station in the horizontal direction is:

$$w = \hat{h} = vec\left(\left[1, e^{j2\pi \sin(\theta_{prob})d/\lambda}, \ldots e^{j2\pi \frac{d}{\lambda}(N-1)\sin(\theta_{prob})d/\lambda}\right]^T \right.$$
$$\left.\left[1, e^{j2\pi \sin(\varphi_{prob})d/\lambda}, \ldots e^{j2\pi \frac{d}{\lambda}(N-1)\sin(\varphi_{prob})d/\lambda}\right]\right)$$

The primary detection signal of the CDI is a three-dimensional transmission beam-forming of a designated direction to detect channel CDI of the terminal is in the horizontal direction and the vertical direction at the same time.

An angle bandwidth of a main lobe of the three-dimensional transmission beam forming in the horizontal direction and the vertical direction is matched with the spatial granularity of the detection region. A matching method and matching principle is same as that in embodiment 1.

Referring back to FIGS. 2A and 2B, at block 209, the terminal estimates channel related information.

At block 210, the terminal determines a direction of an optimal reception beam.

When the terminal configures a two-dimensional antenna array, the direction of the optimal reception beam is selected in a three-dimensional space.

At block 203, the terminal feeds a signal receiving characteristic of the CDI primary detection signal of each detection region back to the base station.

The terminal feeds a gain of the CDI primary detection signal back to the base station. An angle between a true channel direction of the terminal and a normal direction of antennas of the base station is $\theta_{true}$. The true channel direction of the terminal is:

$$h = vec\left(\left[1, e^{j2\pi \sin(\theta_{true})d/\lambda}, \ldots, e^{j2\pi \frac{d}{\lambda}(N-1)\sin(\theta_{true})d/\lambda}\right]^T \right.$$
$$\left.\left[1, e^{j2\pi \sin(\varphi_{true})d/\lambda}, \ldots, e^{j2\pi \frac{d}{\lambda}(N-1)\sin(\varphi_{true})d/\lambda}\right]\right)$$

The terminal may quantize the complex signal gain $g=h^T w$ by use of a fixed codebook, and report a quantized result to the base station. FIG. 6 is taken as an example. Both the terminal and the base station know a codebook of the quantized gain. The specific codebook may be a uniform codebook 601, a non-uniform codebook 602, or another codebook. According to a dynamic range of the receiving gain, the non-uniform codebook 602 may be determined, and a limitation such as minimum average quantization error is satisfied.

Referring back to FIGS. 2A and 2B, at block 204, according to the signal receiving characteristic of the CDI primary detection signal fed back from the terminal, the base station determines a current optimal detection region.

At block 205, the base station determines whether the assistant detection signal is to be transmitted. When the assistant detection signal is to be transmitted, blocks 206-207 are performed. Otherwise, block 211 is performed.

FIG. 9 is taken as an example. After a procedure of detecting the detection set of the first level finishes and the base station has a high requirement for a precision of the CDI, the detection set of the second level is performed. At this time, the assistant detection signal is transmitted to reduce or directly avoid the detection set of the second level. After a process of detecting the detection set of the second level finishes and a highest detection level has reached, the base station may not transmit the assistant detection signal to detect the detection set of the second level.

Referring back to FIGS. 2A and 2B, at block 206, the base station configures a control signaling in the current optimal detection region to notify the terminal to prepare receiving the assistant detection signal, and transmits the assistant detection signal in the current optimal detection region.

Preferably, a three-dimensional beam forming methods corresponding to the assistant detection signal and a three-dimensional beam forming methods corresponding to the primary detection signal of the current optimal detection region are different. Based on the primary detection signal, the assistant detection signal provides differential information of three-dimensional channel CDI of different terminals in the optimal detection region. The base station combines the signal receiving characteristic of the primary detection signal and the signal receiving characteristic of the assistant detection signal to obtain precise CDI of each terminal in the current optimal detection region.

For example, beam forming of the assistant detection signal in the horizontal space, a vertical space and a three-dimensional space may respectively be:

$$w_{assistant,horizontal} = \begin{bmatrix} 1, e^{j2\pi \frac{d}{\lambda}\sin(\theta_{prob})}, \ldots, e^{j2\pi(\frac{N}{2}-1)\sin(\theta_{prob})d/\lambda}, \\ -e^{j2\pi(\frac{N}{2}+1)\sin(\theta_{prob})d/\lambda}, \ldots, -e^{j2\pi(N-1)\sin(\theta_{prob})d/\lambda} \end{bmatrix}^T$$

$$w_{assistant,vertical} = \begin{bmatrix} 1, e^{j2\pi \frac{d}{\lambda}\sin(\varphi_{prob})}, \ldots, e^{j2\pi(\frac{N}{2}-1)\sin(\varphi_{prob})d/\lambda}, \\ -e^{j2\pi(\frac{N}{2}+1)\sin(\varphi_{prob})d/\lambda}, \ldots, -e^{j2\pi(N-1)\sin(\varphi_{prob})d/\lambda} \end{bmatrix}^T$$

$$w_{assistant} = vec(w_{assistant,horizontal} w_{assistant,vertical}^T)$$

At block 207, according to the signal receiving characteristic of the assistant detection signal reported by the terminal, the base station determines that at least one detection region of a next level is taken as a new detection set, and block 201 is repeated.

The base station combines the signal receiving characteristic of the primary detection signal and the signal receiving characteristic of the assistant detection signal to obtain more accurate three-dimensional channel CDI. The terminal quantizes a ratio of a receiving complex gain of the assistant detection signal and a receiving complex gain of the primary detection signal. Afterwards, according to the ratio fed back from the terminal and a relationship between the ratio and the CDI detection error, the base station may determine the CDI detection error of the terminal. Finally, according to the determined CDI detection error, based on the designated direction of the primary detection signal, the base station performs adjustment to obtain precise CDI of the channel of the terminal.

According to factors such as a requirement of estimation precision of the CDI, the number of antennas and a moving speed of the terminal, the base station determines a size of a detection set of a next level. FIG. 9 is taken as an example. When the CDI estimated by the terminal locates in (b2, a2) in FIG. 9, the detection set of the second level may include (b1, a1), (b1, a2), (b1, a3), (b2, a2), (b2, a2), (b2, a3), (b3, a1), (b3, a2), (b3, a3).

When the moving speed of the terminal is low and an error of the receiving characteristic of the primary detection signal of the CDI is low, the base station may take an adjusted channel CDI as the ultimate channel CDI of the terminal, and directly perform detection of the second level to achieve fast CDI acquisition.

Referring back to FIGS. 2A and 2B, at block 211, the base station selects a center of a detection region in the current detection set as the channel CDI of the terminal, and notifies the related information to the terminal via a control signaling.

The terminal receives the information of the ultimate detected channel CDI configured by the base station.

Figure 10:
FIG. 10 is a schematic diagram illustrating a structure of an apparatus according to an embodiment of the present disclosure.

An apparatus corresponding to the method above is provided according to an embodiment of the present disclosure. FIG. 10 is a schematic diagram illustrating a structure of an apparatus according to an embodiment of the present disclosure. The apparatus includes a detection module, a receiving module, and a processing module.

The detection module is to transmit a first detection signal and a second detection signal in at least one detection region, wherein there is differential information between the first detection signal and the second detection signal.

The receiving module is to receive a signal receiving characteristic of the first detection signal and a signal receiving characteristic of the second detection signal from a receiver.

The processing module is to adjust channel direction information (CDI) according to the signal receiving characteristic of the first detection signal and the signal receiving characteristic of the second detection signal.

The at least one detection region is at least one sub-space of a channel direction space, multiple direction regions can collectively cover the channel direction space, the multiple direction regions correspond to at least two levels, and each level comprises of at least one detection region.

Spatial granularities of different levels are different, the first detection signal and the second detection signal transmission starts from a direction region of a level with a widest spatial granularity.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

The invention claimed is:

1. A method for obtaining channel direction information, comprising:
   transmitting a first detection signal in first at least one detection region;
   receiving a reception characteristic of the first detection signal from a receiver;

transmitting a second detection signal in second at least one detection region, wherein information in the second detection signal is different from information in the first detection signal; receiving a reception characteristic of the second detection signal from the receiver; and adjusting channel direction information (CDI) based on a CDI detection error and a direction of the first detection signal, wherein the CDI detection error is determined based on the reception characteristic of the first detection signal and the reception characteristic of the second detection signal.

2. The method of claim 1, wherein each of the first and second at least one detection regions is one sub-space of a channel direction space, wherein multiple detection regions collectively cover the channel direction space, the multiple direction regions corresponding to at least two levels, and each of the levels comprises at least one detection region; and wherein spatial granularities of different levels are different, and wherein transmissions of the first detection signal and the second detection signal start with a direction region of a level with a widest spatial granularity.

3. The method of claim 2, further comprising:
transmitting configuration information of the first detection signal in the first at least one detection region of a current level,
wherein transmitting the second detection signal in the at least one detection region comprises:
according to the reception characteristic of the first detection signal, selecting the second at least one detection region as a detection region to transmit the second detection signal, configuration information of the selected second at least one detection region and configuration information of the second detection signal.

4. The method of claim 3, further comprising:
after adjusting the CDI, determining whether at least one detection region of a next level with smaller granularity is to be detected;
if it is determined that the at least one detection region of the next level is to be detected, considering the next level as the current level; and
transmitting the first detection signal and the second detection signal in the at least one detection region of the next level, respectively.

5. The method of claim 3, wherein selecting the second at least one detection region comprises:
selecting, as the second at least one detection region, a detection region where a receiving gain of the first detection signal is highest.

6. The method of claim 3, further comprising:
selecting at least one detection region of the current level to form a detection set; and
notifying configuration information of the detection set to the receiver;
wherein the first at least one detection region is in the detection set.

7. The method of claim 6, wherein the configuration information of the detection set comprises at least one of a level of each of the at least one detection region, a number of the at least one detection region, an index of each of the at least one detection region, a time-frequency resource location of the first detection signal or the second detection signal, a multiplexing method of the first detection signal and a sequence adopted by the first detection signal.

8. The method of claim 2, further comprising:
transmitting configuration information of the first detection signal in the first at least one detection region of a current level; and
transmitting configuration information of the second detection signal in the second at least one detection region of the current level.

9. The method of claim 8, further comprising:
selecting at least one detection region of the current level to form a detection set; and
notifying configuration information of the detection set to the receiver;
wherein the at least one first detection region and the at least one second detection region is in the detection set, and the first detection signal and the second detection signal is transmitted concurrently.

10. The method of claim 1, wherein the adjusting of the CDI comprises:
determining the CDI detection error according to the reception characteristic of the first detection signal and the reception characteristic of the second detection signal fed back from the receiver; and
adjusting the CDI according to the direction of the first detection signal and the CDI detection error.

11. The method of claim 10, wherein transmission beam-forming of the first detection signal is:

$$w1 = \begin{bmatrix} 1, e^{j2\pi\frac{d}{\lambda}\sin(\theta_{prob})}, \ldots e^{j2\pi(\frac{N}{2}-1)\sin(\theta_{prob})d/\lambda}, \\ e^{j2\pi(\frac{N}{2}+1)\sin(\theta_{prob})d/\lambda} \ldots e^{j2\pi(N-1)\sin(\theta_{prob})d/\lambda} \end{bmatrix}^T,$$

and transmission beam-forming of the second detection signal is:

$$w2 = \begin{bmatrix} 1, e^{j2\pi\frac{d}{\lambda}\sin(\theta_{prob})}, \ldots e^{j2\pi(\frac{N}{2}-1)\sin(\theta_{prob})d/\lambda}, \\ -e^{j2\pi(\frac{N}{2}+1)\sin(\theta_{prob})d/\lambda} \ldots -e^{j2\pi(N-1)\sin(\theta_{prob})d/\lambda} \end{bmatrix}^T,$$

where a sign of first half of a beam forming coefficient of the second detection signal is same as the sign of first half of the beam forming coefficient of the first detection signal, a sign of latter half of the beam forming coefficient of the second detection signal is contrary to the sign of latter half of the beam forming coefficient of the first detection signal.

12. The method of claim 1, wherein an effective detection range of the second detection signal is in a coverage range of a main lobe of the first detection signal within the selected detection region, and wherein characteristics of a first detection signal group and a second detection signal group transmitted to receivers of different CDI are different.

13. The method of claim 1, wherein
the reception characteristic of the first detection signal comprises a receiving gain, a signal-to-noise ratio and a receiving-gain ratio of the first detection signal;
the reception characteristic of the first detection signal is a result quantized by a fixed codebook; and
the reception characteristic of the second detection signal comprises a receiving gain, a signal-to-noise ratio and a receiving-gain ratio of the second detection signal; and
the reception characteristic of the second detection signal is a result quantized by the fixed codebook, wherein the fixed codebook comprises at least one of a uniform quantization codebook and a non-uniform quantization codebook.

14. The method of claim 13, wherein the reception characteristic of the first detection signal and the reception characteristic of the second detection signal comprise a quantized complex number ratio of the receiving gain of the first detection signal relative to the receiving gain of the second detection signal, and wherein the adjusting of the CDI comprises:
  determining the CDI detection error of the receiver according to a relationship between the quantized complex number ratio and the CDI detection error; and
  according to the determined CDI detection error, adjusting the CDI based on a transmission direction of the first detection signal.

15. The method of claim 1, wherein transmitting of the first detection signal and transmitting the second detection signal comprises:
  generating beam forming of a designated direction in at least one of a horizontal direction and a vertical direction through multiple transmission antennas;
  transmitting a beam formed signal wherein a center of a main lobe of a beam of designated direction points to a center direction of a direction region, and an angle bandwidth of the main lobe covers the first at least one detection region and the second at least one detection region,
  wherein the first detection signal and the second detection signal comprise: a synchronization signal, a cell-specific reference signal (CRS), and a channel state information reference signal (CSI-RS), respectively.

16. The method of claim 1, wherein each of the first at least one detection region and the second at least one detection region is one sub-space of a channel direction space.

17. An apparatus for obtaining channel direction information, comprising:
  a transceiver; and
  at least one processor coupled to the transceiver, wherein the at least one processor is configured to:
  transmit a first detection signal in first at least one detection region;
  receive a reception characteristic of the first detection signal from a receiver;
  transmit a second detection signal in second at least one detection region, wherein information in the second detection signal is different from information in the first detection signal;
  receive a reception characteristic of the second detection signal from the receiver; and
  adjust channel direction information (CDI) based on a CDI detection error and a direction of the first detection signal, wherein the CDI detection error is determined based on the reception characteristic of the first detection signal and the reception characteristic of the second detection signal.

18. The apparatus of claim 17, wherein each of the first and second at least one detection region is one sub-space of a channel direction space, the channel direction space comprises multiple direction regions, multiple detection regions collectively cover the channel direction space, the multiple direction regions correspond to at least two levels, and each level comprises of at least one detection region; and
  spatial granularities of different levels are different, and wherein transmissions of the first detection signal and the second detection signal starts with a direction region of a level with a widest spatial granularity.

19. The apparatus of claim 17, wherein each of the first at least one detection region and the second at least one detection region is one sub-space of a channel direction space.

* * * * *